(12) United States Patent
Muraishi et al.

(10) Patent No.: US 6,666,514 B2
(45) Date of Patent: Dec. 23, 2003

(54) STRUCTURE OF REVOLVING SEAT

(75) Inventors: Masami Muraishi, Tokyo (JP); Shigeru Kanai, Tokyo (JP)

(73) Assignee: Tachi-S Co. Ltd., Tokyo (JP)

( * ) Notice: Subject to any disclaimer, the term of this patent is extended or adjusted under 35 U.S.C. 154(b) by 0 days.

(21) Appl. No.: 10/360,921

(22) Filed: Feb. 10, 2003

(65) Prior Publication Data

US 2003/0184142 A1 Oct. 2, 2003

(51) Int. Cl.$^7$ ................................................. B60N 2/14
(52) U.S. Cl. ............... 297/344.22; 248/425; 248/349.1; 297/344.26
(58) Field of Search ............... 297/344.21, 344.22, 297/344.26; 248/425, 349.1

(56) References Cited

U.S. PATENT DOCUMENTS

| | | | | |
|---|---|---|---|---|
| 4,155,593 A | * | 5/1979 | Swenson et al. | 297/344.22 |
| 4,971,392 A | * | 11/1990 | Young | 297/256.12 |
| 5,904,399 A | * | 5/1999 | Kim et al. | 297/344.21 |
| 5,951,106 A | * | 9/1999 | Hirama et al. | 297/344.22 |
| 6,021,989 A | | 2/2000 | Morita et al. | |
| 6,186,573 B1 | * | 2/2001 | Thurab | 297/344.26 |
| 6,575,420 B2 | * | 6/2003 | Yoshida et al. | 248/425 |

* cited by examiner

*Primary Examiner*—Peter R. Brown
(74) *Attorney, Agent, or Firm*—Browdy and Neimark

(57) ABSTRACT

A structure of revolving seat including a revolving frame member and a pedestal fixed at the side of a floor of vehicle. A latch unit is provided between the revolving frame member and pedestal to prevent breakage of the revolving seat and its associated revolving mechanism. The latch unit comprises: a first latch element including a protrudent portion and an engagement hole; and a second latch element including a latch pawl portion. The latch pawl portion of the second latch element is latchingly engaged in the engagement hole of the first latch element, thereby reinforcing the revolving frame member and allowing a great load applied to the revolving seat to be transmitted and escaped through the latch unit to the floor of vehicle.

3 Claims, 2 Drawing Sheets

STRUCTURE OF REVOLVING SEAT

BACKGROUND OF THE INVENTION

1. Field of the Invention

The present invention relates to a revolving seat for use in a vehicle, and in particular to the structure of the revolving seat.

2. Description of Prior Art

A revolving seat is rotatably provided in various vehicles and buses so that the seat may be revolved by 180 degrees about its center of rotation. The revolving seat typically comprises a pedestal fixed on the floor of vehicle and a seat assembly (composed of a seat back and a seat cushion) rotatably mounted on the pedestal via a revolving mechanism or revolving unit. In general, the seat assembly is connected by that revolving unit with the pedestal.

In most cases, a seat belt or particularly a three-point restraining seat belt is provided in this sort of revolving seat. It is therefore of a high likelihood that an excessive great load applied via the seat belt to the seat will result in breakage of the revolving unit.

In the past, to solve such problem, it has been customary to increase the thickness of walls of the revolving unit with a relatively large structure and size. As a consequence thereof, the structure of the revolving unit per se is made complicated and becomes great in weight, which raises costs involved.

SUMMARY OF THE INVENTION

In view of the above-stated drawbacks, it is a primary purpose of the present invention to provide an improved structure of revolving seat which is simplified without requiring complicated structure and without weight increase and also allows a great load applied from a seat belt to be escaped to a floor of vehicle, thereby preventing damage and breakage of associated revolving mechanism in the seat.

In order to achieve such purpose, in accordance with the present invention, the structure of revolving seat is basically comprised of:

a pedestal means fixedly connected with a floor of vehicle;

a securing frame means;

a revolving frame means securely provided on the securing frame means;

wherein the securing frame means and revolving frame means are rotatably connected with the pedestal means via a revolving mechanism and the revolving frame means is fixedly connected with a seat cushion frame; and a latch means provided between the securing frame means and pedestal means, the latch means including:

an opening formed in the pedestal means;

a first latch element having a protrudent portion and a hole, the first latch element being fixed on said pedestal means such that the protrudent portion and hole projects through the opening associated with the pedestal means; and a second latch element including a latch pawl portion defined therein;

the second latch element being fixedly connected with the securing frame means together with a seat belt anchor connected with a seat belt;

wherein the latch pawl portion of the second latch element is latchingly engaged in the hole of the first latch element.

Accordingly, simple provision of the latch means eliminates any special complicated reinforcement structure which will result in undesired large size and weight increase of the revolving seat and revolving mechanism. Since the revolving frame means is positively locked by the above-constructed latch means to the pedestal means at a point where the seat belt anchor is provided, a great load applied to the revolving mechanism form the seat belt is quickly transmitted through the latch means to the pedestal means and escaped to the floor. Thus, the revolving seat and the revolving mechanism is assuredly prevented against damage and breakage. Also, two-point or three-point restrain seat belts may be provided in the revolving seat.

In one aspect of the present invention, the second latch element may have: one end portion which is fixedly connected with the securing frame means in such a manner as to be pendent therefrom; and another end portion having a hole formed therein. The latch pawl portion may be formed in such hole associated with that another end portion, and it may be arranged that the protrudent portion and hole of the first latch element project through the afore-said latch hole.

In another aspect of the present invention, the foregoing one end portion of the second latch element may be rotatably connected via a hinge means with the foregoing another end portion of the second latch element, and a biasing means be provided in the hinge so as to biasingly cause that another end portion to rotate in one direction, thereby making positive latching engagement of the latch pawl portion in the afore-said hole against accidental removal therefrom.

Any other features and advantages of the present invention will become apparent from reading of the descriptions hereinafter, with reference to the annexed drawings.

DETAILED DESCRIPTION OF PREFERRED EMBODIMENT OF THE INVENTION

Figure 1:
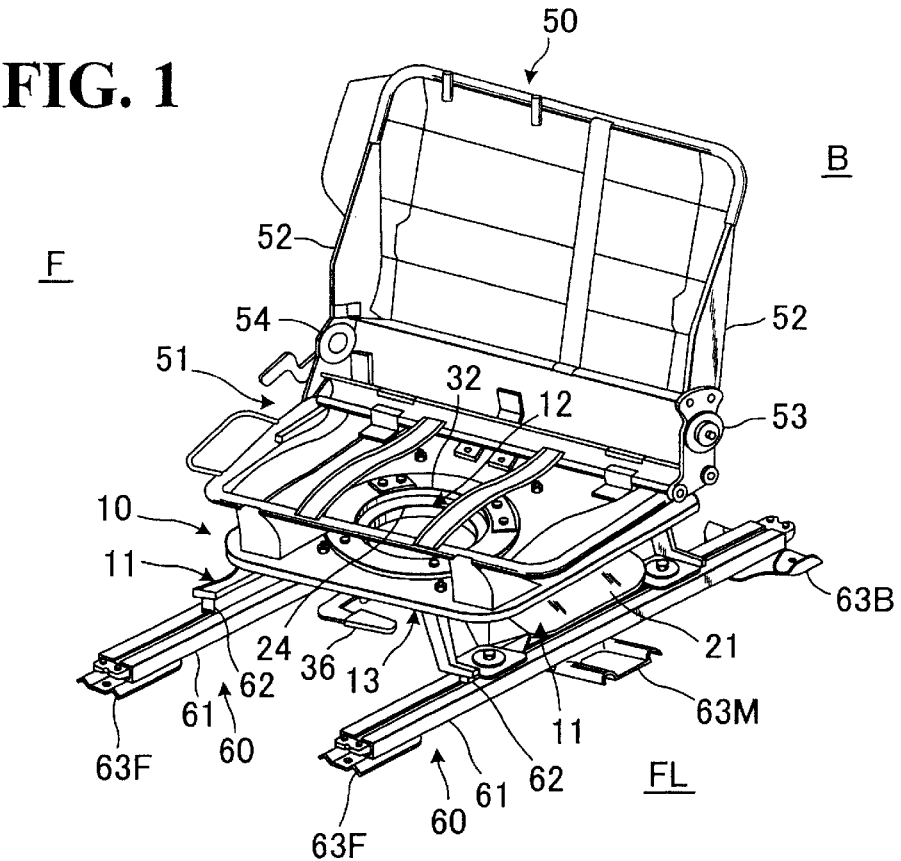
FIG. 1 is a schematic perspective view showing a structure of revolving seat to which the present invention is applied.

Referring to FIGS. 1 through 4, there is illustrated one exemplary preferred embodiment of structure of revolving seat in accordance with the present invention. As is known, in most cases, a revolving seat is provided as a second seat in a recreational vehicle and the like. FIG. 1 shows one exemplary structure of the revolving seat having a revolving mechanism (10). Designations (50) (51) denote a seat back frame and a seat cushion frame, respectively. As shown, the seat back frame (50) has a pair of lateral frame portions (52) (52) rotatably connected with the seat cushion frame (51) by means of a pair of reclining devices (53) (54), so that the seat back frame (50) is adjustably inclinable relative to the seat cushion fame (51). On the other hand, the seat cushion frame (51) is fixedly mounted on a revolving frame member (13).

The revolving mechanism, generally designated by (10), is provided between the revolving frame member (13) and a pair of slide rail devices (60). The revolving mechanism (10) essentially consists of: a pair of riser members or a pair of pedestals (11) (11); a central plate member (12) fixedly connected with those pair of pedestals (11) (11); and a securing frame member (14) on which the foregoing revolving frame member (13) is fixedly mounted.

Designations (60) (60) denote a pair of slide rail devices, each comprising a lower rail (61) and an upper rail (62) slidably fitted in the lower rail (61). Both of the two slide rail devices (60) are firmly attached on the floor (FL) via a plurality of securing plates (63F) (63M) (63B) as understandable from FIG. 1.

Figure 2:
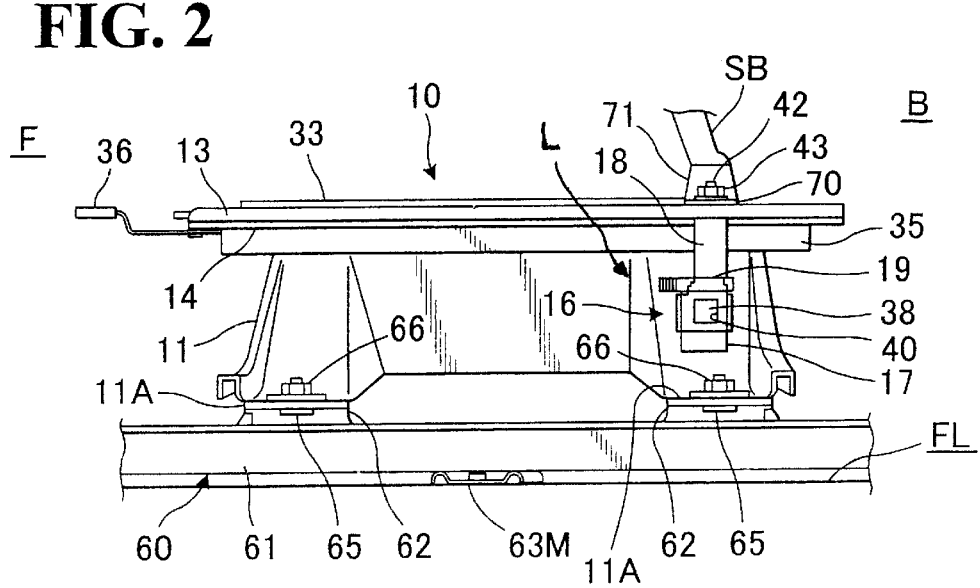
FIG. 2 is an elevational side view of a revolving mechanism provided in the revolving seat, which shows a principal part of the present invention.

As shown in FIGS. 1 and 2, each pedestal (11) has a forward portion facing to a side (F) forwardly of the seat framework and a backward portion facing to a side (B) backwardly of the seat framework. As viewed from FIG. 2, the forward portion of the pedestal (11) is fixedly fastened by the bolt (65) and nut (66) to the forwardly located one of the two slide rail devices (60), while likewise, the backward portion of the pedestal (11) is fixedly fastened by the bolt (65) and nut (66) to the backwardly located one of the two slide rail devices (60). The shown central plate member (12) has a circular hole (24) defined centrally thereof and is formed with a circular groove (26) along the outer peripheral end thereof, the groove (26) being adapted to receive a plurality of balls (27) therein (see FIG. 3). Further, the central plate member (12) has a downwardly extending end portion (25) defined peripherally thereof. While not shown clearly, it should be understood that the downwardly extending end portion (25) extends vertically and continuously from the groove (26) and also extends horizontally in a circular manner relative to the center of the central plate member (12).

Figure 3:
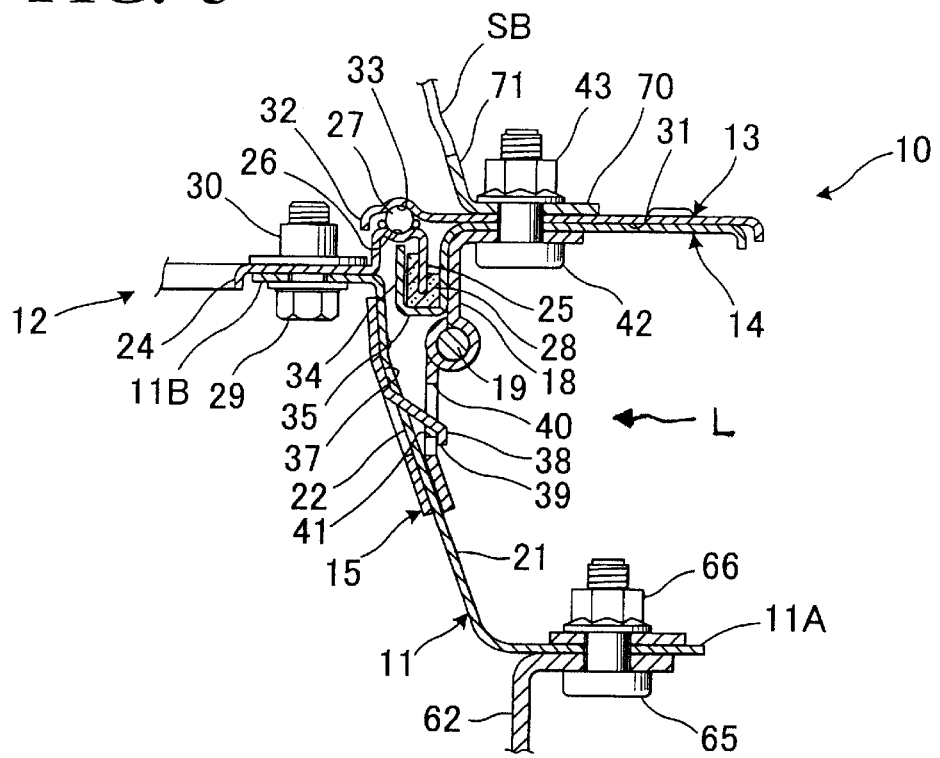
FIG. 3 is a partly broken sectional view showing a latch unit of the present invention.

As can be seen from FIGS. 2 and 3, each pedestal (11) has an upper horizontal securing end portion (116) and a pair of lower spaced-apart horizontal securing end portions (11A) (11A). The upper horizontal securing end portion (11B) of the pedestal (11) is firmly connected with the central plate member (12) by means of securing bolts and nuts (29) (30). On the other hand, the two lower horizontal securing end portions (11A) are firmly connected with the upper rail (62) associated with the slide rail device (60). Hence, it is seen that the central plate member (12) has a firm connection with the slide rail devices (60) through the pedestals (11).

The securing frame member (14) is formed with a circular guide portion (35) of generally U-shaped cross-section. Though not shown, it is to be understood that the guide portion (35) extends along a circle having a center at the center of the securing plate member (14).

The revolving frame member (13) is formed with a circular groove portion (33) along the inward peripheral end thereof, the circular groove portion (33) being adapted to contact the balls (33).

While not clearly shown, as can be understood from FIG. 3, the revolving frame member (13) and securing frame member (14) are firmly connected together by bolts (42) and nuts (43) in such a manner that a plurality of balls (27) are sandwiched between the two grooves (33) (26) respectively of the revolving frame member (13) and central plate member (12), whereas the downwardly extending end portion (25) of the revolving frame member (13) is slidably fitted via a bush (28) in and along the circular guide portion (35) of securing frame member (14). Designation (34) denotes an inward vertical wall of the guide portion (35).

With this structure, both revolving frame member (13) and securing frame member (14) are free to rotate or revolve about the central plate member (12). That is, the seat framework consisting of the seat back frame (50) and seat cushion frame (51), which is fixed on that revolving frame member (13), can be revolved about a central axis of the revolving mechanism (10).

Designation (70) denotes a seat belt anchor. As shown, the seat belt anchor (70) is fastened on the upper surface of the revolving frame member (13) by means of the aforementioned bolt (42) and nut (43). One end of seat belt (SB) is fixed to the upturned end portion (71) of the seat belt anchor (70).

Designation (36) stands for a locking lever adapted to lock and unlock the revolving mechanism (10). As this is well known in the art, further description thereon is omitted. By operating this lever (36), the revolving frame member (13) or the seat framework (i.e. the seat cushion and back frames (50) (51)) can be locked at a desired point against rotation and also unlocked from such locked state to allow rotation of the seat framework.

In accordance with the present invention, there is provided a latch unit (L) for latchingly locking the revolving frame member (13) to the pedestals (11). The illustrated latch unit (L) is comprised of a first latch element (15) provided at the pedestals (11) and a second latch element (16) provided at the revolving frame member (13) and securing frame member (14).

Figure 4:
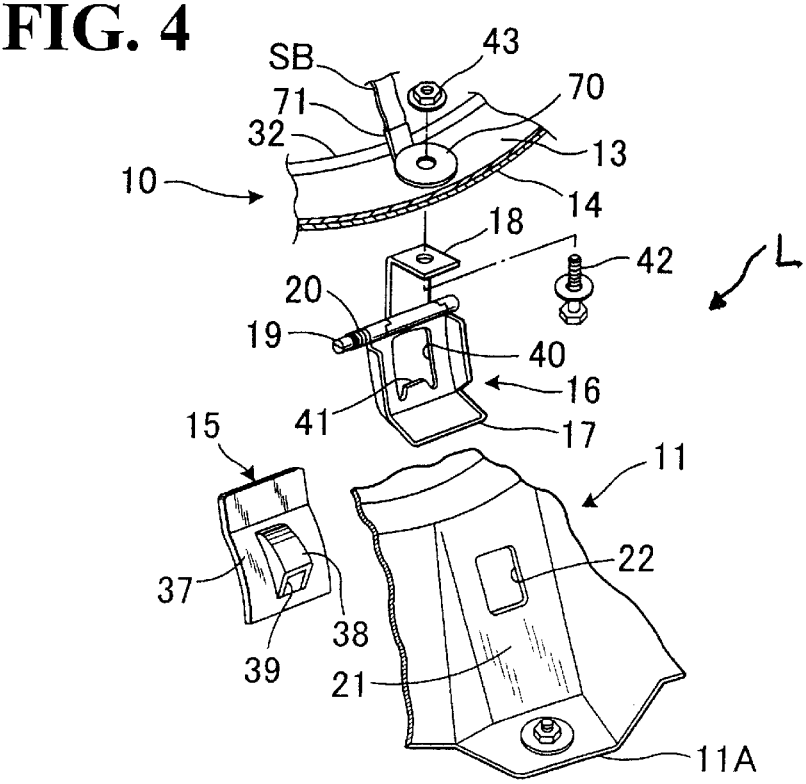
FIG. 4 is a fragmentary explosive perspective view of the latch unit and the associated portions of the revolving seat.

As best shown in FIG. 4, the second latch element (16) comprises an upper securing portion (18) and a latch body portion (17). The upper securing portion (18) is of a generally "inverted-L" shape having: a horizontal end portion in which a hole is formed, as illustrated; and a vertical portion connected with a hinge (19). As shown, the latch body portion (17) is formed with a latch hole (40) and a latch pawl portion (41) defined in the lower edge of the latch hole (40). The hinge (19) is provided with a coil spring (20) thereabout, so that the latch body portion (17) is normally biasingly caused by the spring (20) to rotate in one direction relative to the axis of the hinge (19).

On the other hand, the first latch element (15) comprises a securing plate portion (37) and a protrudent latch portion (38). As shown in FIG. 4, the protrudent latch portion (38) is formed by pressing the corresponding area of the securing plate portion (37) such that a downwardly opened engagement hole (39) is defined in the lower side of the protrudent latch portion (38).

As stated earlier, each pedestal (11) has the forward portion facing to a side (F) forwardly of the seat framework and the backward portion facing to a side (B) backwardly of the seat framework, as can be seen from FIG. 2. In the illustrated embodiment, it is observed from FIG. 2 that the latch unit (L) is disposed at the backward portion of the pedestal (11). Specifically, turning back to FIGS. 3 and 4, it is seen that a vertical lateral surface of the backward portion of pedestal (11) is represented by the designation (21), and that, in such backward pedestal vertical lateral surface (21), a securing hole (22) is formed. The size of the securing hole (22) is slightly larger than that of the afore-stated protrudent latch portion (38).

As understandable from FIG. 3, the first latch element (15) is fixed to the inward surface of the pedestal (11) by inserting the protrudent latch portion (38) thereof through the securing hole (22) and projecting the same to outside of the pedestal (11) and finally by welding the securing plate portion (37) thereof to the inward surface of pedestal (11).

Also, as understandable from FIG. 3, the second latch element (16) is firmly connected, at the securing portion (18) thereof, with the juxtaposed portion of the revolving frame member (13) and securing plate member (14) by means of the bolt (42) and nut (43) so that the second latch element

(16) is pendent from both of the revolving frame member (13) and securing plate member (14). It is noted here that the seat belt anchor (70) is firmly fastened to the upper surface of the revolving frame member (13) by those bolt (42) and nut (43). As best seen in FIG. 3, the latch body portion (17), rotatably connected with the securing portion (18) via the hinge (18), is latchingly engaged with the second latch element (15) in such a manner that the protrudent latch portion (38) of the second latch element (15) projects through the latch hole (40) to the outside of the pedestal (11), and further, the latch pawl portion (41) of the second latch element (15) is engaged in the downwardly opened engagement hole (39) associated with the first latch element (15). Due to the biasing force of the spring (20), the latch pawl portion (41) is positively biased to contact with the inner wall of the protrudent latch portion (38), thereby insuring to prevent accidental removal of the latch pawl portion (41) from the engagement hole (39).

The above-described latch unit (L) is only shown as being disposed at one of the two pedestals (11), but, though not shown, it should be understood that another latch unit of the same structure and latching mechanism as that latch unit (L) is disposed at another of the two pedestals (11), and that another seat belt anchor and seat belt, which are the same as the previously stated ones (70) (SB), are provided on the revolving frame member (13) at a point corresponding to such another latch unit in the same manner that has been described above.

Accordingly, in accordance with the present invention, it is appreciated that the present invention has following advantages:

(i) The revolving frame member (13) is positively locked by the above-constructed latch unit (L) to the pedestal (11) at a point where the seat belt anchor (70) is situated, whereby a great load applied to the revolving mechanism (10) form the seat belt (SB) is quickly transmitted through the latch unit (L) to the pedestal (11) and escaped through the slide rail devices (60) to the floor (F). Thus, the revolving mechanism (10) is assuredly prevented against damage and breakage. Also, two-point or three-point restrain seat belts may be provided in the revolving seat.

(ii) Simple provision of the latch unit (L) eliminates any special complicated reinforcement structure which will result in undesired large size and weight increase of the revolving mechanism (10).

It should be understood that the present invention is not limited to the illustrated embodiment, but any other modification, replacement and addition may be applied thereto without departing from the scopes of the appended claims.

What is claimed is:

1. A structure of revolving seat in combination with a floor of vehicle, in which the revolving seat includes a seat cushion frame and at least one seat belt, comprising:
   a pedestal means fixedly connected with said floor;
   a securing frame means;
   a revolving frame means securely provided on said securing frame means;
   wherein said securing frame means and revolving frame means are rotatably connected with said pedestal means via a revolving mechanism and said revolving frame means is fixedly connected with said seat cushion frame; and
   a latch means provided between said securing frame means and said pedestal means, said latch means including:
      an opening formed in said pedestal means;
      a first latch element having a protrudent portion and a hole, said first latch element being fixed on said pedestal means such that said protrudent portion and said hole project through said opening associated with the pedestal means; and
      a second latch element including a latch pawl portion defined therein
   said second latch element being fixedly connected with said securing frame means together with a seat belt anchor connected with said seat belt;
   wherein said latch pawl portion of said second latch element is latchingly engaged in said hole of said first latch element.

2. The structure of revolving seat as claimed in claim 1, wherein said second latch element has: one end portion which is fixedly connected with said securing frame means in such a manner as to be pendent therefrom; and another end portion having a latch hole formed therein, wherein said latch pawl portion is formed in said latch hole of said another end portion, and wherein said protrudent portion and hole of said first latch element further project through said latch hole associated with said another end portion of said second latch element.

3. The structure of revolving seat according to claim 2, wherein said one end portion of said second latch element is rotatably connected via a hinge means with said another end portion of said second latch element, and wherein a biasing means is provided in said hinge so as to biasingly cause said another end portion to rotate in one direction, thereby making positive latching engagement of said latch pawl portion in said hole against removal therefrom.

* * * * *